US008994748B2

(12) United States Patent
Massimino et al.

(10) Patent No.: US 8,994,748 B2
(45) Date of Patent: Mar. 31, 2015

(54) ANCHORS FOR DISPLAYING IMAGE SPRITES, SUB-REGIONS AND 3D IMAGES (75) Inventors: Pascal Massimino, Cupertino, CA (US); Jeremy Doig, Los Gatos, CA (US); Richard Rabbat, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 873 days.

(21) Appl. No.: 13/104,110

(22) Filed: May 10, 2011

(65) Prior Publication Data

US 2012/0287116 A1 Nov. 15, 2012

(51) Int. Cl.
G09G 5/00 (2006.01)
G06F 17/30 (2006.01)
H04N 13/04 (2006.01)
H04N 13/00 (2006.01)

(52) U.S. Cl.
CPC .......... *G06F 17/30902* (2013.01); *H04N 13/04* (2013.01); *H04N 13/0059* (2013.01)
USPC ............................. 345/629; 345/418; 345/419

(58) Field of Classification Search
USPC .................................................. 345/629, 418
See application file for complete search history.

(56) References Cited

U.S. PATENT DOCUMENTS

| 5,912,668 | A | 6/1999 | Sciammarella et al. |
|---|---|---|---|
| 6,317,885 | B1 | 11/2001 | Fries |
| 6,539,420 | B1 | 3/2003 | Fields et al. |
| 7,210,099 | B2 | 4/2007 | Rohrabaugh et al. |
| 7,788,577 | B2 | 8/2010 | Lueck |
| 7,844,889 | B2 | 11/2010 | Rohrabaugh et al. |
| 2007/0206221 | A1 | 9/2007 | Wyler et al. |
| 2008/0215967 | A1 | 9/2008 | Abrams et al. |
| 2009/0043815 | A1* | 2/2009 | Lee et al. ................... 707/104.1 |
| 2009/0192919 | A1 | 7/2009 | Hess et al. |
| 2009/0217145 | A1 | 8/2009 | Watson |
| 2009/0248831 | A1 | 10/2009 | Scott et al. |
| 2010/0211823 | A1 | 8/2010 | Mao et al. |
| 2011/0050687 | A1 | 3/2011 | Alyshev et al. |
| 2011/0050706 | A1 | 3/2011 | Cherna et al. |
| 2011/0066492 | A1 | 3/2011 | Sumiyoshi et al. |
| 2011/0113000 | A1 | 5/2011 | Marlow |
| 2011/0235066 | A1 | 9/2011 | Sakuragi |
| 2012/0240033 | A1 | 9/2012 | Soni et al. |
| 2012/0287116 | A1 | 11/2012 | Massimino et al. |

OTHER PUBLICATIONS

Office Action mailed Nov. 18, 2011 in U.S. Appl. No. 13/246,658, Massimino, P. et al., filed Sep. 27, 2011.
Office Action mailed Mar. 9, 2012 in U.S. Appl. No. 13/246,658, Massimino, P. et al., filed Sep. 27, 2011.
Non-Final Office Action for U.S. Appl. No. 13/246,658, mailed Jul. 16, 2014, 30 pages.

* cited by examiner

*Primary Examiner* — Maurice L McDowell, Jr.

(57) ABSTRACT

Systems, methods and computer program products for displaying image sprites, sub-regions and three dimensional images includes (but is not limited to) receiving a composite image file containing multiple individual images and an index of the multiple individual images, parsing a Uniform Resource Locator (URL) of the composite image file as a function of the index of the multiple individual images, extracting a desired individual image from the composite image file as a function of the index and displaying the extracted individual image.

20 Claims, 6 Drawing Sheets

ANCHORS FOR DISPLAYING IMAGE SPRITES, SUB-REGIONS AND 3D IMAGES

BACKGROUND

1. Field

Embodiments generally relate to image display, and particularly to image spriting.

2. Background

Image spriting allows the creation of an image sprite where each piece or region of the image sprite represents a separate image. Thus, an image sprite is a collection of images merged or aggregated into a single image.

A web page with many images can take a long time to load and generates multiple server requests. Use of image sprites, where several images are placed into a single image, reduces the number of server requests. The server aggregates several images together in one image sprite instead of providing the images separately. While image spriting conserves network bandwidth, the impact is that original images are not preserved and new image sprites need to be created when an icon/image in the image sprite is replaced or updated.

One example of an image sprite is a Cascading Style Sheet (CSS) image sprite. Images included in such an image sprite need to be "cut" by browser code to display them separately at the browser. In addition, the image sprite must be downloaded completely to be able to display separate images included in the image sprite. The browser needs to execute digital image cropping operations to extract and display a part of the image sprite that represents a distinct image. These operations increase processing complexity.

In addition, when saving multiple small images into one larger image sprite, web developers have to create a new color map that can capture all image colors saved in the sprite. When these small images come from different sources, this contributes to a potentially increased file size of a resultant image sprite. In some cases, creation of a new color map that can capture all image colors saved in a sprite may not even be possible, if the color space is limited (e.g., limited to 256 colors), because all colors occurring in the individual images/icons may not be fully captured in the color map.

Stereoscopy (also called stereoscopic or three-dimensional (3D) imaging) refers to a technique for creating or enhancing the illusion of depth in an image by presenting two two-dimensional (2D) offset images. Both of these 2D offset images are then combined in the brain to give the perception of 3D depth. Using conventional techniques, 3D images for different formats are difficult to create and maintain. Furthermore, a browser is unable to create a three-dimensional image and present 2D offset images separately to a viewer. Thus, developers need to rely on screen technology or spectacles to enable viewing of 3D imagery.

BRIEF SUMMARY

Embodiments relate to anchors for displaying image sprites, sub-regions and 3D images.

An embodiment at a browser includes receiving a composite image file containing multiple individual images and an index of the multiple individual images, parsing a Uniform Resource Locator (URL) of the composite image file as a function of the index of the multiple individual images, extracting a desired individual image from the composite image file as a function of the index and displaying the extracted individual image.

An embodiment at a server includes transmitting an image file containing a plurality of sub-image files and an index associated with the image file, the index containing an index of each sub-image file in the image file, from a website to a browser, and referencing each individual sub-image by an anchor, such that the browser can extract and display one or more of the sub-image files individually as a function of a selected index.

Further embodiments, features, and advantages of the embodiments, as well as the structure and operation of the various embodiments are described in detail below with reference to accompanying drawings.

BRIEF DESCRIPTION OF THE DRAWINGS

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

While embodiments of the present invention are described herein with reference to the illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art to effect such feature, structure, or characteristic in connection with other embodiments whether or not explicitly described. While the following is described in terms of 'webp' images, the embodiments are not limited to this image format and the techniques described herein and can be applied to any other image format and data. The embodiments are applicable to any system having generally the structure of FIG. 2, or that would benefit from the operation, methods and functions as described herein.

One of the problems associated with websites that contain a multitude of images on a single web page is the size of the web page that must be downloaded. As the number of images on a web page increase, bandwidth and/or connection time needed to download the images increases as well. In addition, if a user wishes to view more than one image, it is necessary for the client to download each image individually. Again, this requires more bandwidth and more fetches to a server than is desirable.

Figure 1:
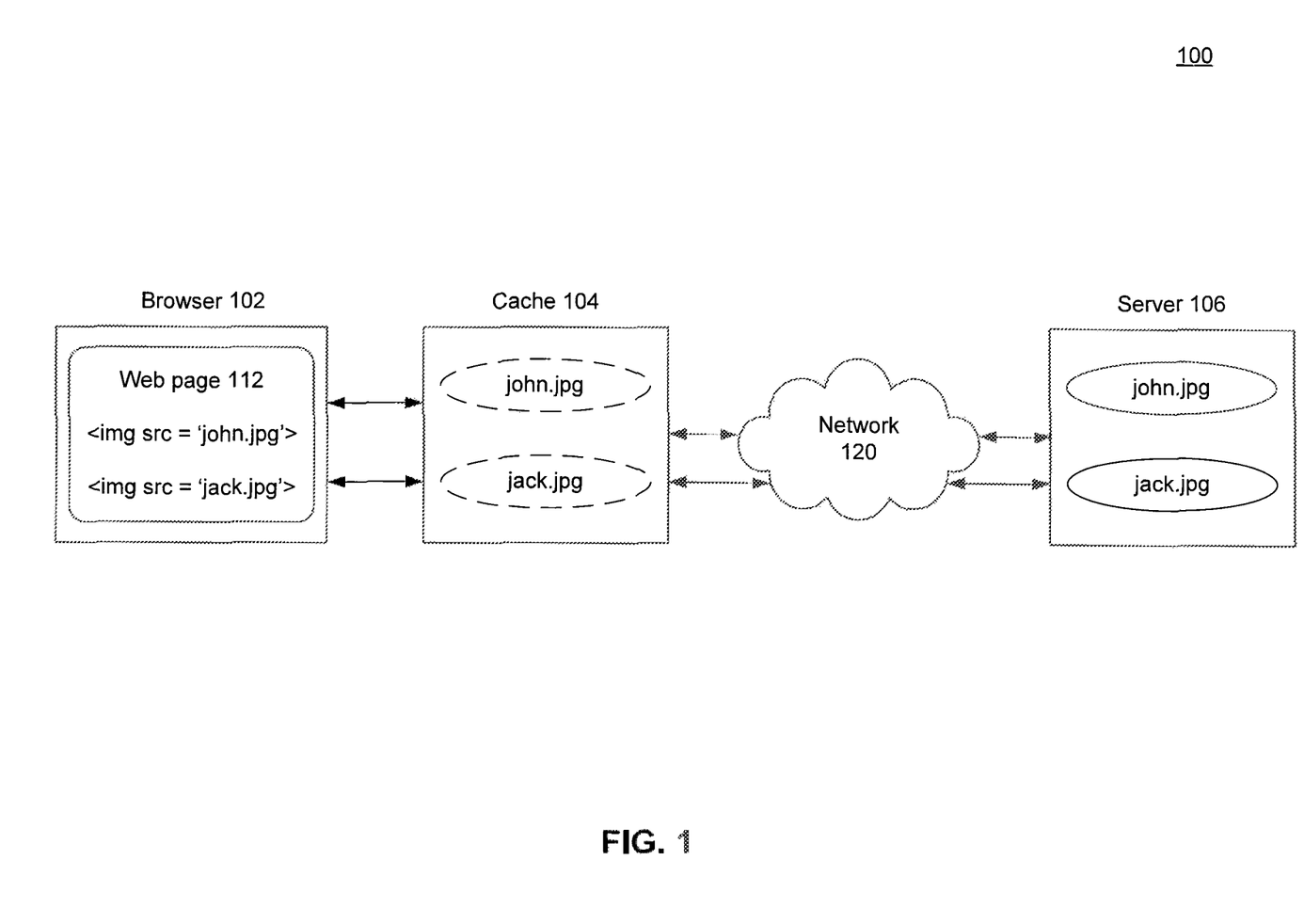
FIG. 1 shows a known technique for displaying multiple images downloaded from a website.

FIG. 1 shows an example of a known technique for downloading multiple images and viewing individual images at a client browser. The known technique uses the services of a browser 102, a cache 104, a server 106 and a network 120. Browser 102 downloads a Hyper Text Mark-up Language (HTML) web page 112 containing multiple images at the request of a user using browser 102. Browser 102 and server 106 can communicate over network 120.

As known to those skilled in the art, an '<img>' tag embeds an image in a HTML web page. Images are, for example, not inserted in their entirety into an HTML web page, but are instead linked to the HTML page. Thus, the <img> tag creates a holding space in the HTML page for a linked or referenced image.

When a web page is loaded, it is browser 102, at that moment, that retrieves an image from server 106 (or from cache 104 where it may be previously stored), and inserts the image into the web page for display.

The <img> tag generally has two attributes: 'src' and 'alt'. The src or source attribute indicates the location or file path of an image on a server. The alt attribute is meant to be used as an alternative text that may be displayed when the image is not available at the server.

Images can be embedded in web pages using standard HTML <img> tags, examples of which are as follows:

<img src="john.jpg">
    <img src="jack.jpg">

In these examples, the sourced images are Joint Photographic Experts Group (JPEG) images "john.jpg" and "jack.jpg". It is clear that the John and Jack images and the JPEG format are exemplary only. Sourced images may include other images, such as icons, animated images, and the like.

The images are saved in cache 104 from which they can be drawn for display by browser 102. In known systems, each time a user wishes to view a different image not stored in cache 104, browser 102 must send another request to server 106 to download the different image file. Thus, if the user wants to view an image of John, browser 102 requests "john.jpg" by parsing "<img src="john.#jpg">" and the image of John is displayed. If the image of John is saved in cache 104, browser 102 retrieves the image of John from cache 104 for display. If the image of John is not saved in cache 104, browser 102 goes back out to server 106 to request John's image file which can then be stored in cache 104 upon retrieval.

In known systems, if the user wants to next view the image of Jack, browser 102 requests "jack.jpg" by parsing "<img src="jack.#jpg">". If the image of Jack is saved in cache 104, browser 102 retrieves the image of Jack from cache 104 for display. If the image of Jack is not saved in cache 104, browser 102 sends another request to server 106 to retrieve Jack's image file. This operation requires a second client to server connection, which results in use of additional bandwidth and connection time. For example, if there are a total of 20 images to be viewed individually at browser 102, and each image is 5 Kb in size, this viewing requires 20 downloads of 5 Kb each, thus requiring 20 separate fetches to obtain all of the images.

Embodiments of this invention avoid problems associated with multiple connections required to view multiple individual images as well as complexity issues associated with conventional image spriting and display techniques. Embodiments which incorporate features of the present invention will be described in detail below.

Systems, methods and computer program products disclosed herein require only a single download of a group image (or image sprite/composite image file). This requires only a single connection between a browser and a server. Thereafter, individual images in the group image can be retrieved and displayed from the browser or a cache without having to make additional connections to the server.

As noted above, an image sprite is a collection of images aggregated or placed into a single image. Image sprites are useful to download, for example, group pictures that contain multiple individual images, or multiple icons that appear on a single web page. The use of an image sprite reduces the number of server requests and saves the number of connections or fetches required to download and view multiple individual images.

Icons and/or images that are found on a web page can be grouped together into a single image sprite. Then each individual icon can be accessed according to the embodiments discussed below. Only one group image (or image sprite file) needs to be sent to a user's browser. This saves substantial connection overhead by sending only one group image file that groups several individual images/icons together. Metadata included in the group image file can be used to display image content different from the full image file. Namely the metadata can be used to display individual images, icons and/or sub-regions that were grouped in the group image file for downloading from the server to the browser; and/or the metadata can be used to display individual images that are contained in a group image file downloaded from the server to the browser.

An image file, for example: 'image.webp', is created in which multiple individual image webp images, for example: '1.webp', '2.webp', '3.webp' are saved. Each of the individual images in image.webp are referenced by an anchor, for example: 1.webp is referenced by 'image.webp#1', 2.webp is referenced by 'image.webp#2' and 3.webp is referenced by 'image.webp#3'. As noted above, while the following is described in terms of 'webp' images, the embodiments are not limited to this image format and the techniques described herein can be applied to any other image format and data.

The use of anchors enables a browser to use a new and much more simplified code than complex conventional code used to extract one or more images from a sprite (e.g., CSS image sprite).

For example, according to an embodiment of the present invention, a browser parses:

<img src="image1.webp#2"> to extract a desired portion i.e., 2.webp (represented by the anchor '2') of a group image file.

Such simplified code is in contrast to complex code that is currently used to display individual images from a CSS sprite, for example:

```
.btn__top {
    background-image: url(http://www.example.com/sprite.png);
    background-position: 45px -10px;
}
```

Such conventional CSS code locates exact pixel locations (e.g., 45 px-10 px) of a desired image within the image sprite (e.g., sprite.png). Furthermore, such complex code has to be maintained across many pages every time the image sprite is regenerated. For example, if the pixel location of a desired image within the image sprite changes, the CSS code of every page referencing the desired image must be changed. Thus, conventional CSS image spriting techniques require a browser to execute complex digital image cropping operations based on the specified pixel locations to be able to extract and display a part of the image sprite.

Embodiments of the present invention overcome such conventional issues by referencing individual images within an image sprite using anchors and then enable a browser to use simplified code to display desired images within the image sprite using the anchors (e.g., anchor '2' in <img src="image1.webp#2">). Embodiments can also be configured to display one or more sub-regions (e.g., sub-rectangles) of an image sprite using the anchors.

For 3D imagery, conventional techniques provide a 3D image to a browser where both left and right views, needed to create a perception of 3D depth, are merged inseparably into a single image. Browsers are unable to extract and display left and right views separately.

In contrast to such conventional approaches, embodiments of this invention incorporate left and right views of a picture into a 3D image file that is sent from a server in a manner that enables separation of the left and right views at a browser. Then, to provide a viewer with perception of three 3D depth, the left view can be displayed on a first display device and the right view can be displayed on a second display device.

This can be accomplished by sending one image file that contains both left and right view images. With anchors, the left and right 2D views can be preserved and accessed as follows:

<img src="image.webp#left"> and <img src="image.webp#right">

An exemplary HTML img src attribute for the image file containing both views is:

img src=<"my3dimage.webp#left&#right">

Thus, only a single file needs to be sent to transfer images representing both views once. Using anchors (e.g., "left" or "right") embodiments of the invention can then select the left and/or the right image to view for display. In this way, subfiles, containing the left and right views, respectively, can be transferred in one image file and then extracted using the anchors. The left image is displayed by the browser on a first display and the right image is displayed on a second display to give a viewer perception of 3D depth.

In order to take advantage of the system and method disclosed herein, embodiments of the invention enable users to create a group image file, for example, 'mypicture.webp' that can be referenced by <img src="mypicture.webp">.

A group image can be indexed into sub-regions or individual images, for example, by assigning anchor values (or anchor names) to regions of the group image. The group image file along with the indexed metadata is then downloaded to the browser from the server and cached.

If an indexed portion, sub-region or sub-image is requested by the browser to be displayed, then the requested portion of the group image will be displayed. If no specific indexed sub-image is requested by the browser, then the entire group image (or raw image) can be displayed within the e browser.

Other indexed portions of the same group image file can also be displayed individually by accessing the cached indexed group image file instead of establishing several connections to the server to download individual images.

In other words, the group image need only be transferred once to the browser. At the browser, the indexed portions can be displayed individually by accessing the indexed portions from a cache (e.g., using <img src="mygrouppicture.webp#john">).

In this way, embodiments of the invention reduce connection overhead because it is only necessary to send the group image file once to the browser where it can be cached. Furthermore, as noted above, by referencing individual images/sub-regions within an image sprite using anchors, a browser can use simplified code to display desired images/sub-regions within the image sprite using the anchors.

Figure 2:
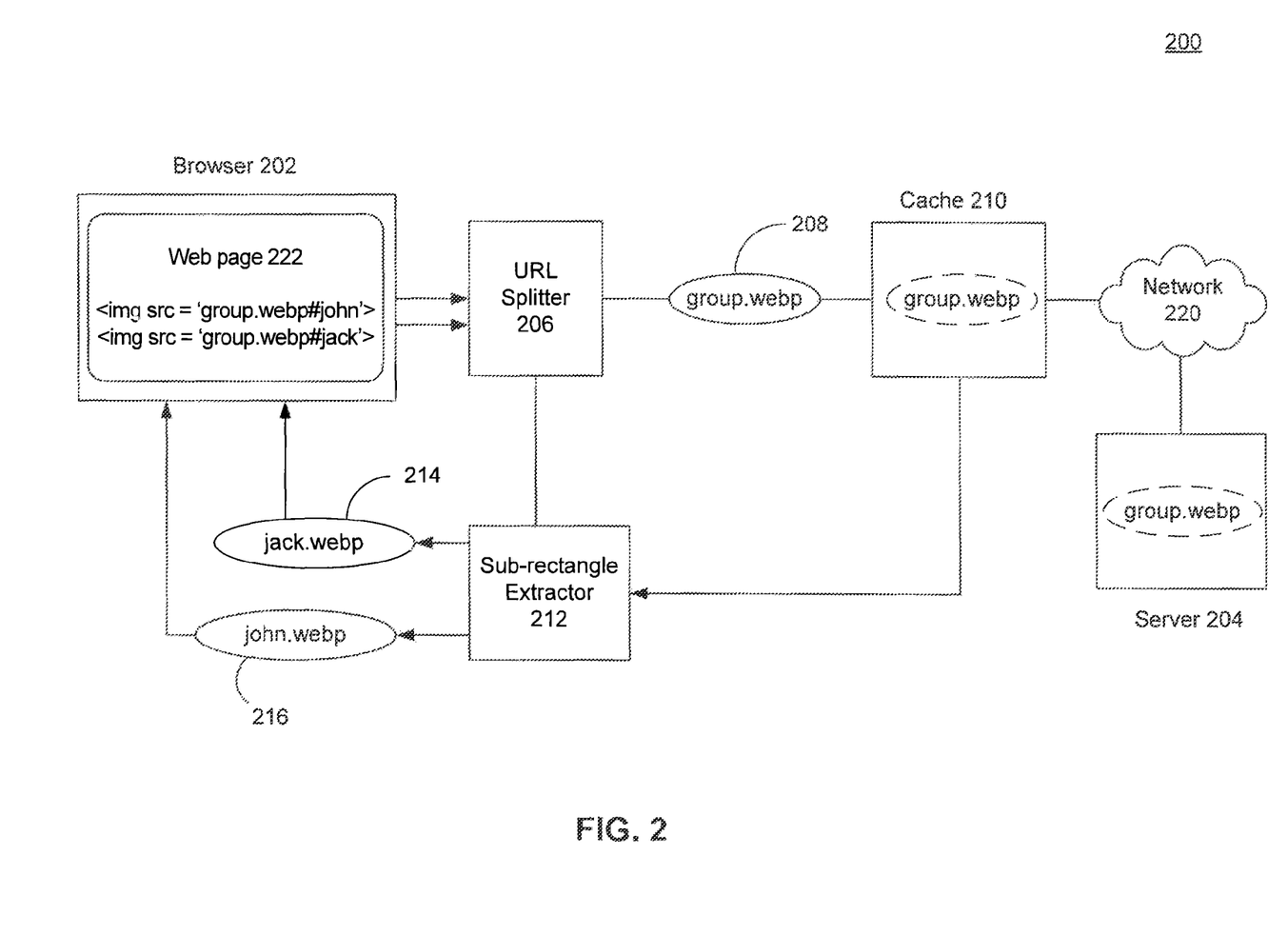
FIG. 2 shows an exemplary system for displaying image sprites, sub-regions and 3D images, according to an embodiment.

FIG. 2 illustrates a system for displaying image sprites, sub-regions and 3D images.

A browser 202 requests a group image from a server 204. As shown in FIG. 2, browser 202 requests the group image over a network 220. Network 220 may include one or more networks, including but not limited to, a local area network, medium-area network, and/or wide-area network, such as the Internet. Network 220, for example, may be any form of wired or wireless network that allows browser 202 and server 204, and any additional clients or servers, to communicate with each other.

Browser 202 retrieves the group image by parsing HTML syntax in a web page 222, such as <img src="group.webp">. The group image represented by "group.webp" may contain a number of individual image files, which are individually referenced using HTML syntax, such as <img src="group.webp#john">, <img src="group.webp#jack">, etc. Thus, each individual image file in the group image can be identified by a separate anchor or index (e.g., "#john," "#jack," etc.).

The group image file 'group.webp' is parsed by a Uniform Resource Locator (URL) splitter or parser 206 into its component image parts. A file 'group.webp' 208 and the index of individual images are stored in a cache 210.

When a user sends a request to browser 202 to display a particular image (e.g., an image of John), URL splitter 206 (e.g. an HTML parser) extracts the image file of John (using <img src="group.webp#john">) from the "group.webp" group image file using sub-rectangle extractor 212 and sends individual image file "john.webp" 216 to browser 202 to be displayed. Similarly, when the user sends a subsequent request to browser 202 to display an image of Jack, URL splitter 206 extracts the image file of Jack (<img src="group.webp#jack">) from the 'group.webp' group image file using a sub-rectangle extractor 212 and sends an image file "jack.webp" 214 to browser 202 for display. The images are extracted as sub-images from the "group.webp" file in whatever form is appropriate.

A feature of this embodiment is that only one call to server 204, and thus only one connection to server 204, is needed to request the group image file 'group.webp'. Individual image files that are embedded in the 'group.webp' file, along with the index of the individual image files, are downloaded once from server 204 to cache 210. Thereafter, all requests for individual images are made locally at the client between browser 202 and cache 210.

In this way, embodiments of the invention save network bandwidth and connection overhead by caching a group image file and using natural HTML anchor syntax to access parts of the same group image file. The index of the group image file is part of the metadata transmitted with the image file. The index is accessed using the HTML anchor syntax to display individual images, or sub-regions located within the group image file.

Embodiments of the invention leverage the anchor syntax to display parts (or sub-regions) of a single group image file or image sprite. URL splitter 206 reads (or parses) the anchor syntax and extracts information about the group image file (or metadata) that is requested and information relating to the group image file to be displayed. URL splitter 206 extracts desired sub-regions from the group image file and returns the sub-regions to browser 202. In essence, URL splitter 206 acts as an image fragmenter that parses the anchor syntax to obtain sub-regions and/or sub-images using the group image file as a source.

URL splitter 206 includes an anchor parser that reads an image sprite source file and extracts a sub-file that was requested through the anchor mechanism. Whenever a URL (e.g., <img src="group.webp#john">) is requested, the anchor parser determines that the first part of the URL (e.g., "group.webp") is the name of an image file that is to be retrieved from the server or cache. The second part is determined to be an anchor (e.g., #john) which relates to an index and tree data structure that represents the location of the sub-file within the image file. For example, the index and tree associates the anchor '#john' with the location of John's image within the group image file. In this way, when URL splitter 206 reads (or parses) the anchor syntax, the image of John can be efficiently located within the group image file.

One benefit of the disclosed embodiments is with web pages that display many thumbnails. In conventional approaches, it was necessary to download each thumbnail separately from a server. If there were 20 thumbnails on a web page, it would take 20 separate fetches to download each thumbnail separately from the server. Modern browsers open multiple connections (typically 6) to the server such that files are downloaded in parallel over the open connections. The fetches in these separate connections block the browser from fetching other content from the server that is required for the page, such as, but not limited to, other images and Javascript code. Even with use of image sprites, conventional approaches relied on a browser to execute complex digital image cropping operations to be able to extract and display a part of the image sprite that represents a distinct image.

With the disclosed embodiments, all 20 thumbnails can be downloaded with one connection as single group image file with an index to each sub-part or sub-region of the group image file. Following the one download, the group image file can be parsed and fragmented to display individual thumbnails as desired by the client using the anchor syntax noted above. With the dynamic approach of the disclosed method and system, using an index that is embedded into the group image file itself, if it is desired to change the sub-picture to be displayed, it is only necessary to change the index and tree to refer to a new sub-picture. Therefore, the entire group image need not be regenerated and re-transmitted to the browser, saving processing resources and network bandwidth. Embodiments need not require reconfiguration of the browser or other client-side components as changes to a group image file can be incorporated at a server and into an index included with the image.

Figure 3:
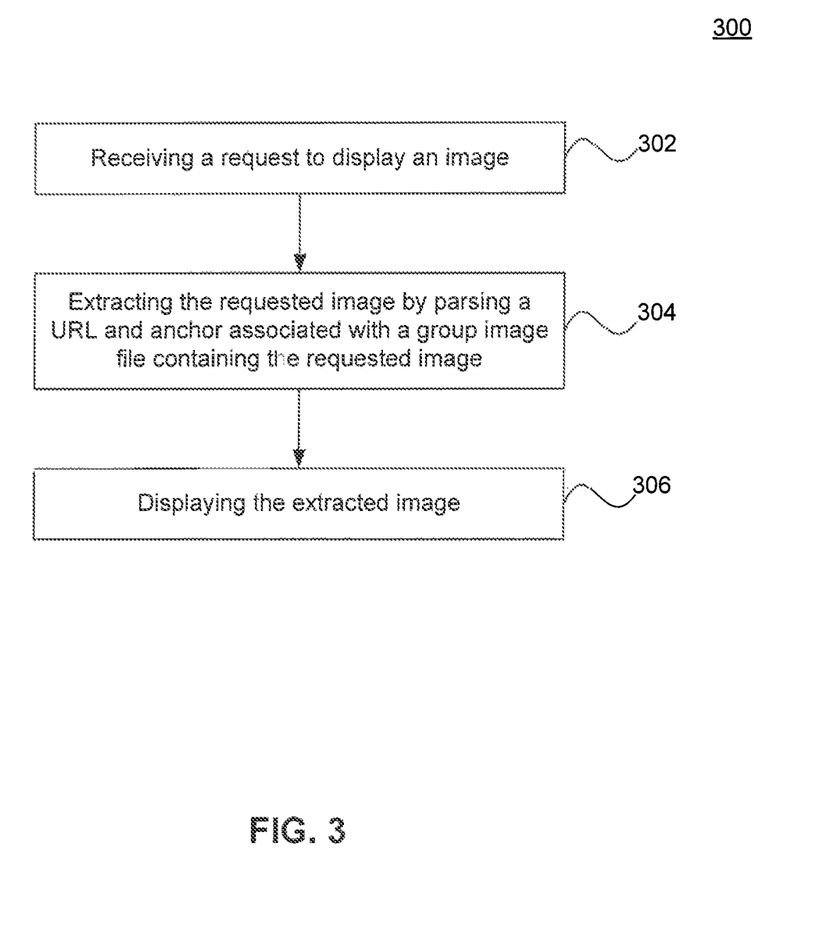
FIG. 3 is a flowchart illustrating a further exemplary operation of the system of FIG. 2.

FIG. 3 is a flowchart illustrating method 300, which is an exemplary operation of system 200.

Method 300 begins with receiving a request to display an image (step 302). As an example, a browser receives a request to display an image of John (e.g., "john.webp") Once the request for the image is received, the requested image is extracted from a group image file (or an image sprite) by parsing a URL and anchor associated with the image (step 304). Once the requested image is extracted from the group image file using the anchor, the requested image is displayed (step 306). As an example, when the client sends a request to browser 202 to display a particular image, e.g., John, URL splitter 206 extracts the image file of John (using <img src="group.webp#john">) from the 'group.webp' group image file using sub-rectangle extractor 212 and sends individual image file "john.webp" 216 to browser 202 to be displayed.

Figure 4:
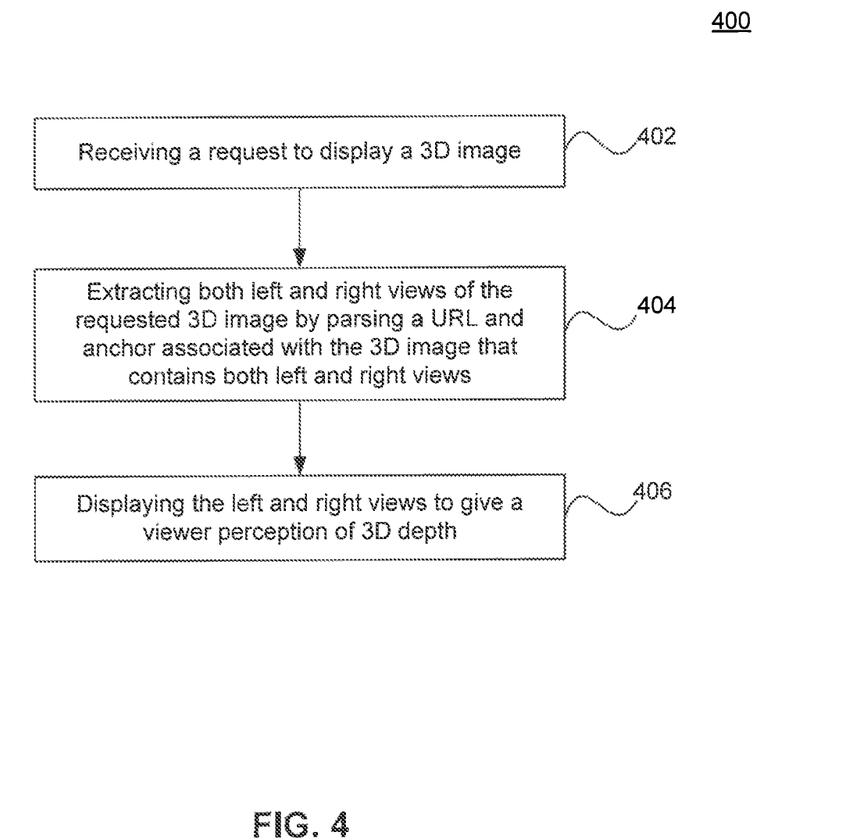
FIG. 4 is a flowchart illustrating an exemplary operation of the system of FIG. 2, according to another embodiment.

FIG. 4 is a flowchart illustrating method 400, which is an exemplary operation of system 200, according to another embodiment.

Method 400 begins with receiving a request to display a 3D image (step 402). As an example, a browser receives a request to display a 3D image named 'my3dimage.webp'. Once the request for the 3D image is received, left and right image views in the requested 3D image are determined to be extracted from a group 3D image file (or an image sprite) (e.g., img src=<"my3dimage.webp#left&#right">) by parsing a URL and locating the anchor (e.g., "left" and "right") associated with the 3D image (step 404). Once the left and right image views are extracted from the group 3D image file using the anchor, the left and right views are displayed on separate displays (step 406). Thus, only a single file needs to be sent once to transfer images representing both views once. Using anchors (e.g., #left or #right) the left or the right image can then be selected for display. In this way, sub-files, containing the left and right views, respectively, can be transferred in one image file and then extracted using the anchors. The left image can be displayed by the browser on a first display and the right image can be displayed on a second display to give a viewer perception of 3D depth.

Figure 5:
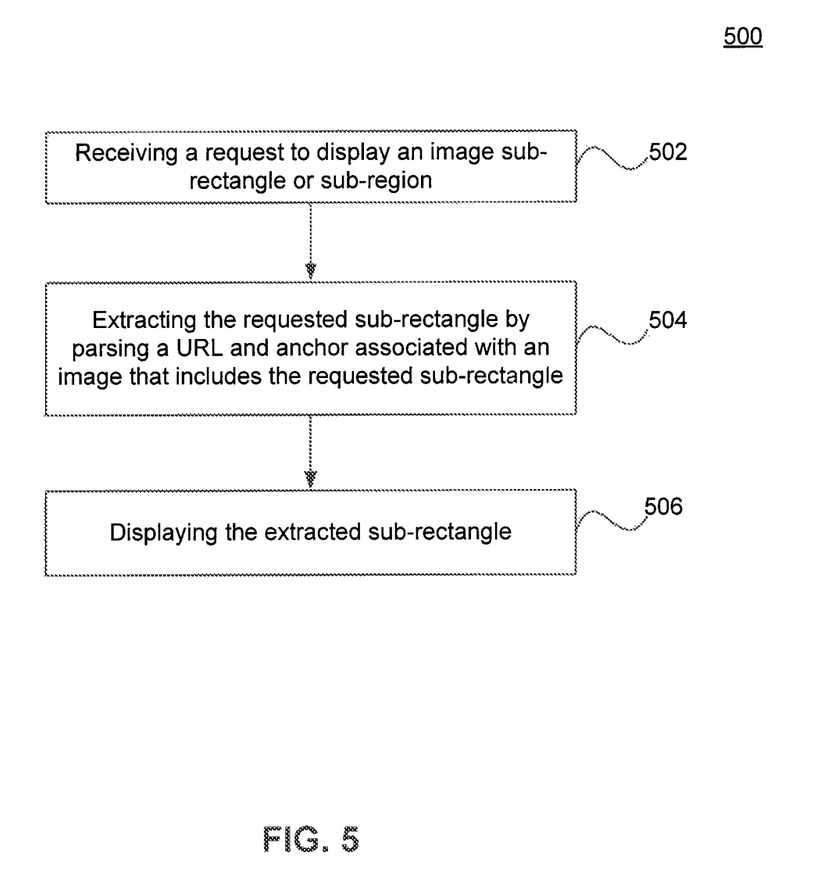
FIG. 5 is a flowchart illustrating an exemplary operation of the system of FIG. 2, according to yet another embodiment.

FIG. 5 is a flowchart illustrating method 500, which is an exemplary operation of system 200, according to another embodiment.

Method 500 begins with receiving a request to display an image sub-rectangle or sub-region (step 502). Once the request for an image sub-rectangle is received the requested sub-rectangle is extracted from a group image file (or an image sprite) by parsing a URL and anchor associated with the group image file (step 504). Once the requested sub-rectangle is extracted from the group image file using the anchor, the requested sub-rectangle is displayed (step 506).

Embodiments of the invention may be implemented in hardware, software, firmware, or a combination thereof. Embodiments may be implemented via a set of programs running in parallel on multiple machines. Components of the system illustrated in FIG. 2 can be implemented on any type of processing (or computing) device having one or more processors. For example, browser 202 can be implemented within a workstation, mobile device (such as a mobile phone, tablet, or laptop), computer, cluster of computers, set-top box, embedded system, console, or other device having at least one processor. Such a processing device may include software, firmware, hardware, or a combination thereof. Software may include one or more applications and an operating system. Hardware can include, but is not limited to, a processor, memory and graphical user interface display. A user can interact with browser 202 to provide data to browser 202 and receive (or view) data from browser 202.

Example Computer Embodiment

Figure 6:
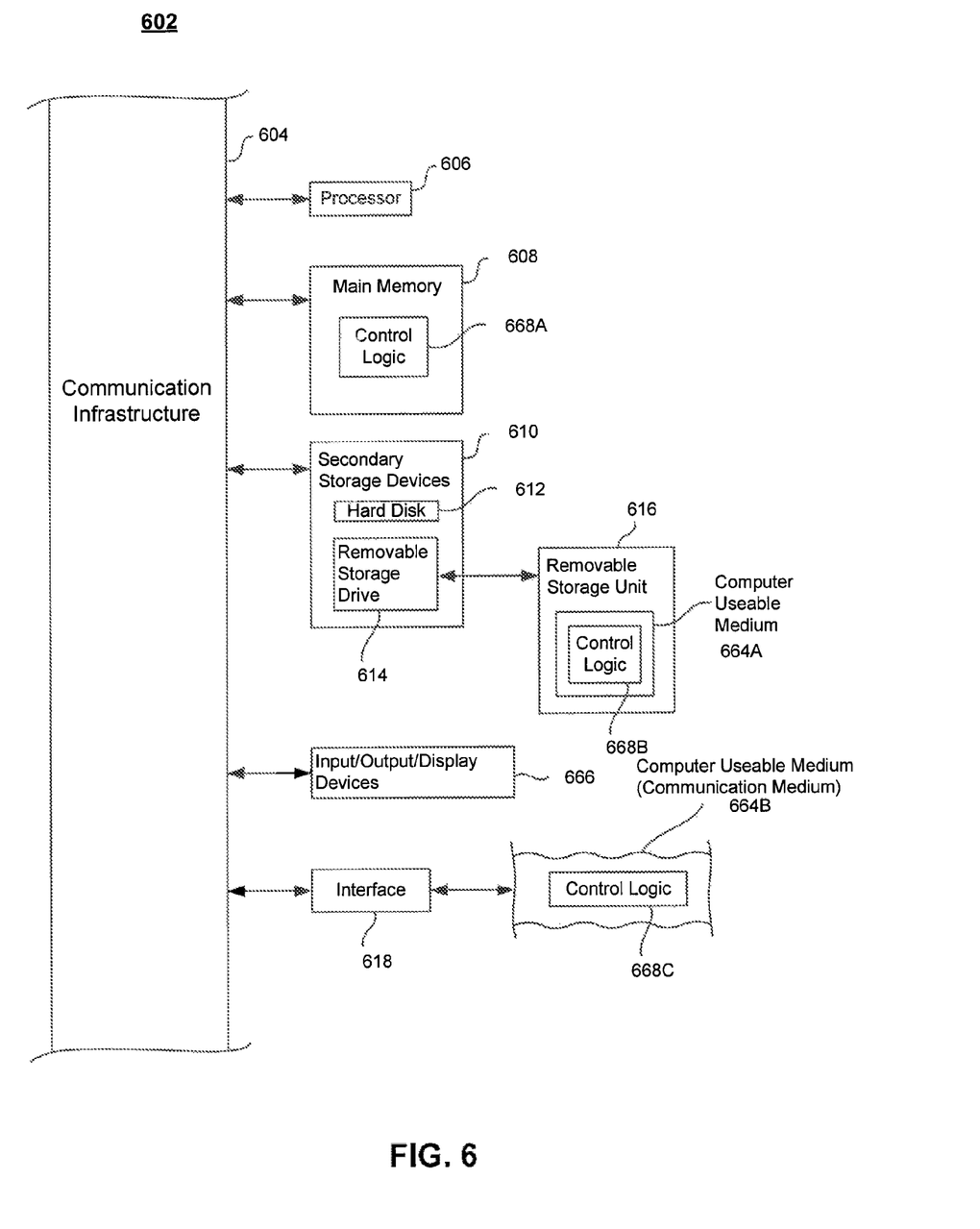
FIG. 6 illustrates an example computer useful for implementing components of embodiments of the invention.

The system and components of embodiments described herein may be implemented using one or more computers, such as example computer 602 shown in FIG. 6.

Computer 602 can be any commercially available and well known computer capable of performing the functions described herein, such as computers available from International Business Machines (IBM), Apple, Oracle, HP, Dell, Cray, etc.

Computer 602 includes one or more processors (also called central processing units, or CPUs), such as a processor 606. Processor 606 is connected to a communication infrastructure 604.

Computer 602 also includes a main or primary memory 608, such as random access memory (RAM). Primary memory 608 has stored therein control logic 668A (computer software), and data.

Computer 602 also includes one or more secondary storage devices 610. Secondary storage devices 610 include, for example, a hard disk drive 612 and/or a removable storage device or drive 614, as well as other types of storage devices, such as memory cards and memory sticks. Removable storage drive 614 represents a floppy disk drive, a magnetic tape drive, a compact disk drive, an optical storage device, tape backup, etc.

Removable storage drive 614 interacts with a removable storage unit 616. Removable storage unit 616 includes a computer useable or readable storage medium 664A having stored therein computer software 668B (control logic) and/or data. Removable storage unit 616 represents a floppy disk, magnetic tape, compact disk, DVD, optical storage disk, or any other computer data storage device. Removable storage drive 614 reads from and/or writes to removable storage unit 616 in a well-known manner.

Computer 602 also includes input/output/display devices 666, such as monitors, keyboards, pointing devices, Bluetooth devices, etc.

Computer 602 further includes a communication or network interface 618. Network interface 618 enables computer 602 to communicate with remote devices. For example, network interface 618 allows computer 602 to communicate over communication networks or mediums 664B (representing a form of a computer useable or readable medium), such as LANs, WANs, the Internet, etc. Network interface 618 may interface with remote sites or networks via wired or wireless connections.

Control logic 668C may be transmitted to and from computer 602 via communication medium 664B.

Any tangible apparatus or article of manufacture comprising a computer useable or readable medium having control logic (software) stored therein is referred to herein as a computer program product or program storage device. This includes, but is not limited to, computer 602, main memory 608, secondary storage devices 610 and removable storage unit 616. Such computer program products, having control logic stored therein that, when executed by one or more data processing devices, cause such data processing devices to operate as described herein, represent the embodiments.

Embodiments can work with software, hardware, and/or operating system implementations other than those described herein. Any software, hardware, and operating system implementations suitable for performing the functions described herein can be used. Embodiments are applicable to both a client and to a server or a combination of both.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method, comprising:
generating a composite image file containing a plurality of individual images and an index, wherein an individual image in the plurality of individual images is referenced using an anchor, and the index in the composite image file associates the anchor to a location of the individual image in the composite image file; and
transmitting the generated composite image file to a browser, whereby the browser extracts the individual image from the composite image file using the index and the anchor.

2. The method of claim 1, further comprising:
generating a Uniform Resource Locator (URL) of the composite image file, wherein the URL includes the anchor identifying the individual image contained in the composite image file.

3. The method of claim 2, further comprising:
formatting the URL of the composite image file into an image src tag in a message having data in a HyperText Markup Language (HTML).

4. The method of claim 2, wherein the URL further includes a name of the composite image file.

5. The method of claim 1, wherein the individual image is located in a sub-region of the composite image file and the anchor identifies the sub-region.

6. The method of claim 1, wherein the generating further comprises:
associating a second individual image in the composite image file with a second anchor, wherein the accessibility of the anchor of the individual image and the second anchor of the second individual image eliminates a server receiving multiple requests from the browser that displays the individual image and the second individual image.

7. The method of claim 1, wherein the transmitting further comprises:
transmitting the composite image file as a single download from a server to the browser.

8. The method of claim 1, further comprising:
associating a left view image from the composite image file with the index and a first anchor in the URL; and
associating a right view image from the composite image file with the index and a second anchor in the URL, whereby the browser separately displays the left and right view images such that the displayed left and right view images generate a perception of a three-dimensional image.

9. The method of claim 1, wherein metadata in the composite image file includes the index.

10. A system, comprising:

a memory;

one or more processors coupled to the memory and configured to:

generate a composite image file containing a plurality of individual images and an index, wherein an individual image in the plurality of individual images is referenced using an anchor, and the index in the composite image file associates the anchor to a location of the individual image in the composite image file; and initiate a transmission of the generated composite image file to a browser, whereby the browser extracts the individual image from the composite image file using the index and the anchor.

11. The system of claim 10, wherein the processor is further configured to:

generate a Uniform Resource Locator (URL) of the composite image file, wherein the URL includes the anchor identifying the individual image contained in the composite image file.

12. The system of claim 11, wherein the processor is further configured to:

format the URL of the composite image into an image src tag in a message having data in a HyperText Markup Language (HTML).

13. The system of claim 11, wherein the URL further includes a name of the composite image file.

14. The system of claim 10, wherein the individual image is located in a sub-region of the composite image file and the anchor identifies the sub-region.

15. The system of claim 10, wherein to generate the composite image file, the one or more processors are further configured to:

associate a second individual image in the composite image file with a second anchor, wherein the accessibility of the anchor of the individual image and the second anchor of the second individual image eliminates a server receiving multiple requests from the browser that displays the individual image and the second individual image.

16. The system of claim 10, wherein the one or more processors are further configured to initiate the transmission of the composite image file as a single download from a server to the browser.

17. The system of claim 10, wherein the processor is further configured to:

associate a left view image from the composite image file with the index and a first anchor in the URL; and associate a right view image from the composite image file with the index and a second anchor in the URL, whereby the browser separately displays the left and right view images such that the displayed left and right view images generate a perception of a three-dimensional image.

18. The system of claim 10, wherein metadata in the composite image file includes the index.

19. A non-transitory computer readable medium including instructions stored thereon, that, when executed by a computing device, cause computing device to perform operations, the operations comprising:

generating a composite image file containing a plurality of individual images and an index, wherein an individual image in the plurality of individual images is referenced using an anchor, and the index in the composite image file associates the anchor to a location of the individual image in the composite image file; and transmitting the generated composite image file to a browser, whereby the browser extracts the individual image from the composite image file using the index and the anchor.

20. The computer readable medium of claim 19, further comprising:

generating a Uniform Resource Locator (URL) of the composite image file, wherein the URL includes the anchor identifying the individual image contained in the composite image file.

* * * * *